April 18, 1944.    E. HARPER    2,346,680
PROPELLER SPINNER
Filed July 3, 1941    2 Sheets-Sheet 1
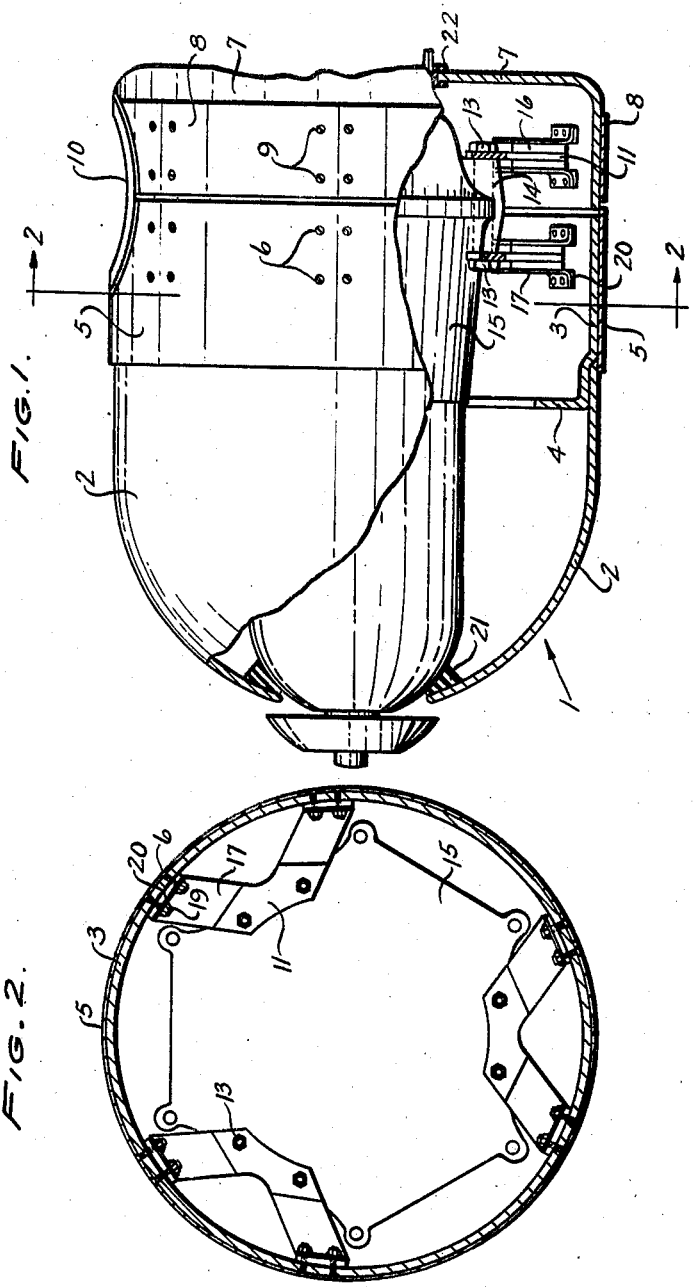

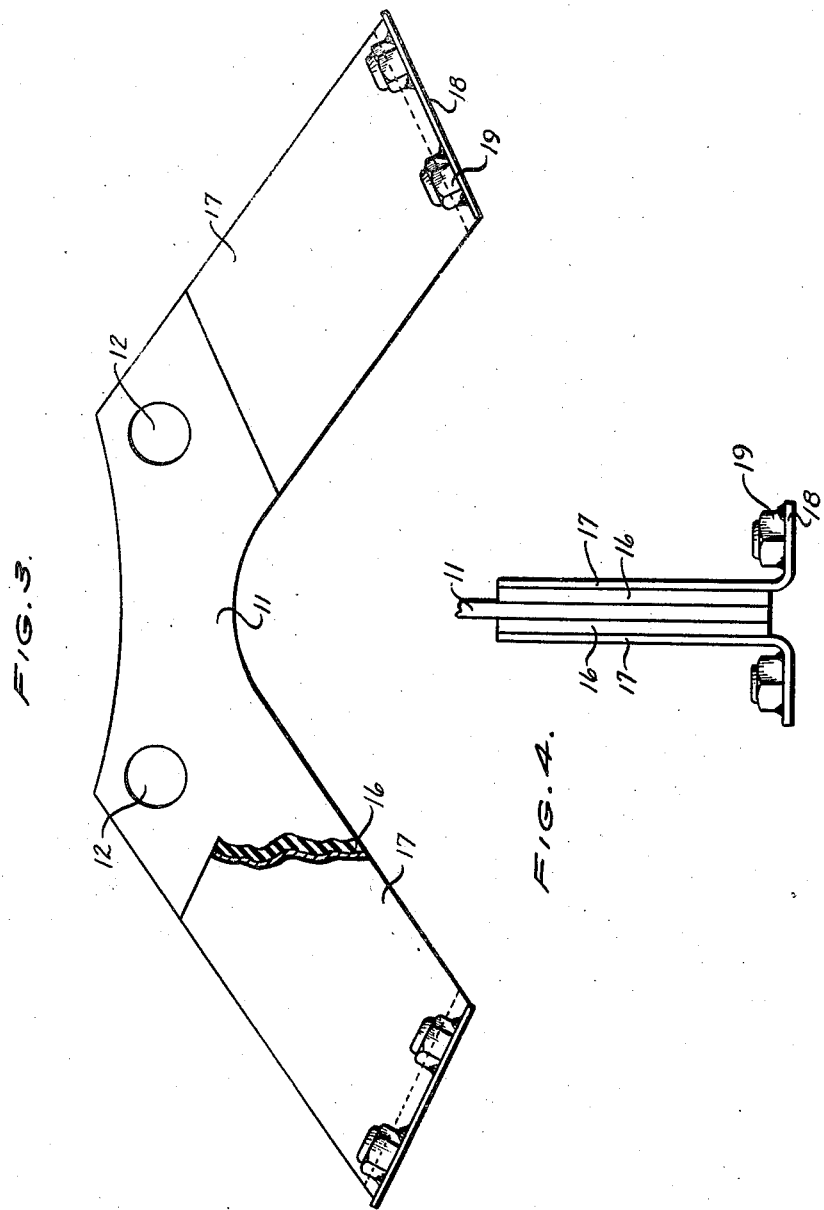

Patented Apr. 18, 1944

2,346,680

UNITED STATES PATENT OFFICE 2,346,680

PROPELLER SPINNER

Elwood Harper, Dayton, Ohio

Application July 3, 1941, Serial No. 400,943

1 Claim. (Cl. 170—159)

(Granted under the act of March 3, 1883, as amended April 30, 1928; 370 O. G. 757)

The invention described herein may be manufactured and used by or for Government for governmental purposes, without the payment to me of any royalty thereon.

This invention relates to a propeller spinner and slinger ring assembly and more particularly to an improved form of spinner and a novel means for mounting the same on the hub of the propeller shaft of an airplane engine.

The existing types of propeller spinners are subject to numerous disadvantages such as the tendency of the spinner to bulge at the base due to the centrifugal force created by the high speed rotation of the propeller hub and the tendency of the mounting screw holes in the spinner to become enlarged and elongated because of propeller vibration and because of sudden changes in the speed of rotation of the hub. The present type of spinners are also difficult to balance, this being especially true in those spinners which are shaped by spinning the metal to the prescribed form. In this operation the metal tends to pile up ahead of the spinning tool, thereby causing uneven distribution of the weight and resulting in poor static and dynamic balance of the finished product. The present day metal spinners are also quite heavy and expensive to manufacture.

The existing types of mountings for securing the spinners to the propeller hubs are also subject to numerous disadvantages, such as being unnecessarily heavy and complex, as well as failing to properly utilize the resilient qualities of the rubber supports pads used therein. In one particular type of spinner mounting with which I am familiar, namely, the Siebenthaler type, in which rubber bushings of the Lord type are utilized, the rubber in the bushing is stressed in tension and compression when radially directed loads such as those resulting from the unbalance of the spinner are encountered. It is well known, however, that rubber is much less resilient when subjected to tension or compression loads than it is when placed in shear. Hence, the resilient properties of the rubber are not used to the fullest advantage in this type of mounting.

In my improved form of spinner and mounting therefor the above-mentioned disadvantages have all been overcome. I propose to make the spinner from a plastic material of suitable characteristics, one such material being that which is known to the trade as Plexiglas. By the use of this material, a spinner may be fabricated which is lighter in weight than a metal spinner of corresponding size and consequently will not be subject to as great inertia loads. Thus, it is possible to reduce the size and weight of the mounting brackets and an appreciable cumulative saving in weight effected. By the use of a transparent plastic, inspection of the propeller hub is made possible without the removal of the spinner. This material may be formed to the proper shape by the usual molding process employed in shaping plastic materials and, as a result, a uniform product of very nearly perfect static and dynamic balance may be secured. It is also possible during the molding process to vary the thickness of the shell as desired, i. e., the nose of the spinner may be made relatively thin while the base portion thereof may be somewhat thicker so as to better withstand the centrifugal force acting thereon. Another advantage of a plastic spinner is that it may be made more quickly and cheaply than one formed out of metal and also may be formed to any desired configuration or shape.

The improved type of mounting means for securing the spinner to the propeller hub is extremely simple in design and light in weight. In addition it is so designed that the rubber mounting pads will take any radially directed loads (those due to any unbalance in the spinner) as well as all inertia loads (those imposed by the sudden starting and stopping of the propeller shaft) in shear. Any load imposed upon the spinner in a direction parallel to the axis of the hub will result in a tension or compression stress being applied to the rubber pads. Thus, it will be seen that the greatest resiliency of the rubber is utilized in overcoming the radial and rotational loads, whereas the least resilient properties of the rubber will resist those loads applied parallel to the axis of the hub.

Accordingly, one object of my invention is to provide an improved form of spinner which is light in weight, transparent, and which may be manufactured quickly and cheaply.

Another object of my invention is to provide an improved form of mounting for the spinner which is light in weight and extremely simple in design, and which utilizes advantageously the different resilient qualities of the rubber cushioning pads.

A further object of my invention is to provide a stainless steel reinforcing rim around the hub of the spinner to prevent any expansion of the same due to the centrifugal force acting thereon.

With the above and other objects in view, the invention consists in the construction, combination and arrangement of parts hereinafter set forth and claimed.

In the drawings:

Fig. 1 is a plan view of a propeller hub and spinner with parts of the latter broken away so as to more clearly show the method of mounting the same upon the propeller hub.

Fig. 2 is a cross sectional elevation taken on the line II—II of Fig. 1, showing the arrangement of the mounting brackets around the hub.

Fig. 3 is a plan view of the mounting bracket with parts broken away to more clearly show the construction thereof.

Fig. 4 is an end view of a portion of the bracket showing the arrangement of the plates and rubber pads constituting the same.

As shown in Fig. 1 of the drawings, 1 represents generally the propeller spinner which I propose shall be made of any suitable plastic material, one such material being that known to the trade as Plexiglas. A sheet of the plastic is molded into the dome-shaped form shown in Fig. 1. If desired, the spinner may be made in two sections, a dome shaped section 2 and a cylindrically shaped section 3. This type of construction makes possible the formation of a strengthening rib 4 integral with the section 3, the sections 2 and 3 being subsequently bonded together so as to form one integral unit. A thin band of stainless steel 5 is bonded to the outer surface of the section 3 so as to strengthen the spinner in this area and, in addition, to afford a better mounting surface for the screws 6 which hold the spinner fast to the mounting brackets. It is to be understood, of course, that the spinner 1 may be made up in a single piece if desired, rather than by making use of the two part construction herein shown and described. A slinger ring shell 7 is also preferably made out of a plastic material and a reinforcing steel band 8, similar to that used on the spinner, is bonded in place onto this shell in order to strengthen it and also to provide a better mounting surface for the screws 9 which hold it on the mounting brackets. Holes 10 are formed in the spinner and the slinger ring shell in order to permit the propeller blades to extend therethrough. While the details of the slinger ring assembly have not been shown, these may take the usual form, i. e., a circular trough is secured to the shell 7 for holding the de-icing fluid and suitable conduits are extended from the trough to the base of the propeller blades.

The details of the mounting brackets are best shown in Figs. 3 and 4. A plate 11, having a shape such as that shown in Fig. 3, is provided with two holes 12 for accommodating the bolts 13 which serve to secure the plate to the bosses 14, formed on the propeller hub 15. Blocks of rubber 16, or of a rubber substitute such as neoprene, are vulcanized or otherwise bonded to each side of the plate 11. It is preferable to use a rubber substitute such as neoprene rather than ordinary rubber, inasmuch as the former is much less likely to be adversely affected by the oil and grease which may escape from around the propeller hub. To these blocks 16 are vulcanized or otherwise bonded, two plates 17, one on either side of the bracket 11. The bottom edges of the plates 17 are bent over to form flanges 18. Holes are drilled in each of these flanges and nuts 19 are welded on the upper side of the flange above these holes. These nuts receive the mounting screws 6 and 9 which hold the spinner and slinger ring shell to the brackets. Small pads 20, preferably made of a rubber substitute, are bonded to the outside surfaces of the flanges and serve to prevent chafing between the flanges and the plastic spinner.

It will now be evident that in my improved form of mounting bracket the resilient blocks 16 are stressed in shear whenever a radially directed load, such as would be encountered if the spinner were slightly unbalanced, is imposed on the spinner or slinger ring shell. It is also clear that these blocks will be stressed in shear whenever an inertia load is placed on these parts due to the sudden starting or stopping of the hub. Any end thrust on the spinner or slinger ring shell, however, will be taken up by tension or compression in the blocks 16. Thus it will be seen that a more resilient resistance will oppose the first two types of loads than will oppose the third type of load. Hence, the varying characteristics of the rubber in shear and in tension and compression are used to the utmost advantage in my type of mounting.

It is also to be noticed that there is no metal to metal contact between the spinner and the hub and that no vibration may be transferred from the hub to the spinner except through the rubber pads 16. The pads 16 may be varied in thickness or in hardness to alter the damping effect or to change the natural frequency of vibration. In a rigid form of mounting between a spinner and a hub it would be impossible to alter the resonant frequency of vibration of the spinner, whereas this may be readily done in my form of mounting. It will also be noticed that the brackets may be secured to the hub and this unit balanced before placing the spinner thereon. Hence, only the spinner remains to be balanced and, in the plastic form of spinner such as I propose to use, the unbalance is negligible and may be disregarded. After the spinner has been slipped in place over the hub and mounting brackets, it may be readily secured to the latter by means of the screws 6. A cushioning ring 21 made of a rubber substitute such as neoprene is bonded to the nose of the spinner so as to resiliently locate the nose on the forward end of the propeller hub. A similar cushioning ring 22 is provided between the slinger ring shell and the rear end of the hub. Thus there is no contact between the hub and the spinner and slinger ring shell except through the resilient rings 21 and 22 and the rubber pads 16 of the mounting brackets.

Having thus described my invention, what I claim as new and desire to secure by Letters Patent is:

In a device of the class described having a rotatable hub and a spinner surrounding said hub, said spinner having a cylindrical body portion and a dome-shaped end portion, the improvement consisting of means for resiliently mounting said spinner on said hub, said means including a plurality of circumferentially spaced groups of plates each consisting of three parallelly disposed plates whose faces lie in the plane of rotation of said hub, one plate of each group being secured to the periphery of said hub and extending outwardly toward said spinner and the remaining two plates of each group being secured to said cylindrical portion of said spinner, one on either side of said one plate and extending inwardly toward said hub in an overlapping and spaced relationship with respect to said one plate, each of said remaining two plates being provided with an outwardly turned flange at its outer end for facilitating its attachment to said spinner, and a resilient cushioning material located between said one plate and each of said remaining two plates and also between said flanges and said spinner, said material being firmly bonded to each of said plates and to said flanges to thereby form a soft-acting and cushioned mounting device for said spinner.

ELWOOD HARPER.